Patented Mar. 15, 1932

1,849,594

UNITED STATES PATENT OFFICE

FRITZ SCHRÖTER, OF BERLIN, GERMANY, ASSIGNOR TO TELEFUNKEN GESELLSCHAFT FÜR DRAHTLOSE TELEGRAPHIE M. B. H., OF BERLIN, GERMANY, A CORPORATION OF GERMANY

OXIDE CATHODE

No Drawing. Application filed June 12, 1929, Serial No. 370,469, and in Germany June 9, 1928.

It has been known in the prior art to make high emission cathodes or filaments by causing the vapors of highly reducing metals to act upon metal filament suitably oxidized superficially. For instance, thermionic tubes are manufactured by causing barium azid to decompose by heating while the tube is being exhausted, and then the ensuing vapors of barium are caused to act upon an oxidiferous (oxide-containing) tungsten filament provided with a coat of oxide. It is very likely that the filament thus obtained is endowed with high electron emitting powers because the barium more or less combines with the oxide of the filament metals with the incidental production of finely divided barium oxide (baryta).

It has likewise been known in the prior art to obtain pronounced maxima of emissivity in oxide cathodes by using mixtures of oxides of alkaline earth metal and the metallic oxides of other groups, such as ceria or lanthanum oxide, in certain proportions. Such a marked maxima of emitting powers is found, for instance, in a mixture of 90% baryta and 10% lanthanum oxide or a mixture of 10% baryta and 90% lanthanum oxide. The process of manufacturing cathodes of this kind according to previous practice has been to apply the mixtures in question in the form of a layer of oxide upon the carrier filament or substratum.

The present invention has for its object to combine the advantages of the said two methods, namely, of the metal oxide method and the oxide mixture method. For this purpose, by the aid of the vaporizing method, a mixture comprising a most favorable proportion of metallic oxides of the alkaline earth group with such other groups of oxide mixtures as hereinbefore mentioned, is applied upon the surface of the bearer or carrier metal used as a substratum. For instance barium azid is decomposed by heating, and other metals of the kind under consideration, e. g., lanthanum or cerium, are added so that there results a mixture of metallic vapors of different kinds, and this mixture is caused to act on an oxide-containing filament body.

It is also possible to proceed in the following manner:

To the metal of the carrier filament, say, tungsten, there are added oxides of cerium, lanthanum, etc., in fine division and of the requisite concentration in the course of the manufacture of the filament, and the resultant body is subjected to the vaporizing process in which only an azid of the alkaline earth metal is employed. What results in either case upon the surface of the carrier wire is a mixture of the oxide of the alkaline earth metal and of such of the said other oxides as have been used. At all events, the working conditions are so chosen that there is obtained an optimum composition of the finely divided oxide mixture for maximum electron emission.

In case the addition of lanthanum oxide, ceria, or other equivalent oxides or oxide mixtures to the carrier metal, say, tungsten, should be inadvisable in the course of its being shaped into a ductile body, then the said oxides or oxide mixtures in small quantities and in extremely fine division are subsequently brought upon the surface of the tungsten filament, whereupon the cathode thus prepared is subjected to the vaporizing process, say, by the use of barium azid.

Having now described my invention, what I claim is:

1. The method of producing an electron emitting cathode which comprises exposing in vacuo to a vapor of an alkaline earth metal a carrier consisting principally of a refractory metal with oxide of cerium incorporated in and disseminated thru it, and thereby producing an adherent highly emissive coating on said carrier.

2. The method of making an electron emitting cathode comprising a carrier of tungsten in which oxide of cerium is incorporated which comprises placing said carrier in an envelope containing barium azide, evacuating said envelope, and heating said barium azide in vacuo to decompose it and thereby produce on said carrier an adherent coating of high electron emissivity.

3. An electron emitting cathode comprising a carrier of refractory metal in which oxides of cerium and lanthanum are incorporated and an electron emissive coating on said carrier comprising an alkaline earth.

4. An electron emitting cathode comprising a carrier of tungsten intimately admixed with oxide of cerium, and an adherent coating of a compound of barium on said carrier.

FRITZ SCHRÖTER.